United States Patent [19]

Miyahara

[11] Patent Number: 5,055,666

[45] Date of Patent: Oct. 8, 1991

[54] SURVEYING APPARATUS DETECTING RELATIVE ANGULAR POSITION OF PROJECTOR AND RANGE FINDER

[76] Inventor: Kenji Miyahara, 16-3, Soya 8-chome, Ichikawa-shi, Chiba-Ken, Japan, 272

[21] Appl. No.: 530,391

[22] Filed: May 30, 1990

[30] Foreign Application Priority Data

May 5, 1989 [JP] Japan .................................. 1-134498

[51] Int. Cl.$^5$ ............................................ G01J 40/14
[52] U.S. Cl. .................................. 250/206.1; 356/152
[58] Field of Search ........................ 250/206.1, 206.2; 356/5, 141, 152

[56] References Cited

U.S. PATENT DOCUMENTS

| | | | |
|---|---|---|---|
| 4,343,550 | 8/1982 | Buckley et al. | 356/152 |
| 4,494,870 | 1/1985 | Hentschel et al. | 356/152 |
| 4,709,580 | 12/1987 | Butts, Jr. et al. | 250/206.1 |
| 4,820,041 | 4/1989 | Davidson et al. | 356/152 |

Primary Examiner—David C. Nelms
Assistant Examiner—Que T. Le
Attorney, Agent, or Firm—Wenderoth, Lind & Ponack

[57] ABSTRACT

A stationary base unit including a laser projector, laser range finder, and a universal slewing device is disposed at a base point and is controlled by wireless by operating a data processing unit connected to a target unit which is disposed at one of a plurality of subsidiary survey points distant from the base point. With this surveying apparatus, a survey of land and so on can be made by only one operator on the survey point side.

5 Claims, 3 Drawing Sheets

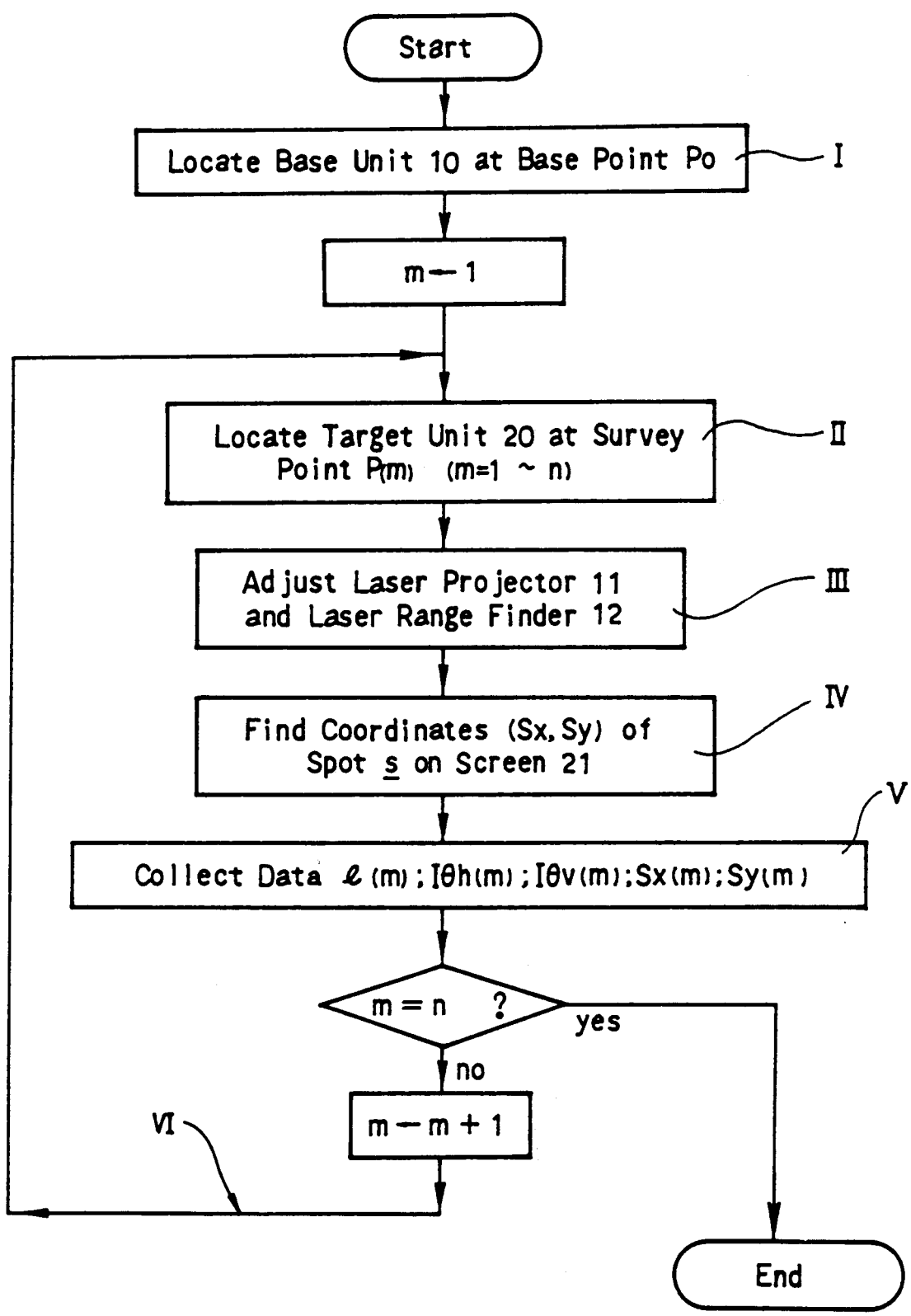

SURVEYING APPARATUS DETECTING RELATIVE ANGULAR POSITION OF PROJECTOR AND RANGE FINDER

BACKGROUND OF THE INVENTION

1. Field of the Invention

This invention relates to a surveying apparatus for automatically making a survey of land and various construction sites such as buildings with a high degree of accuracy in an easy operation, and more particularly to an automatic surveying apparatus in which various survey data can be collected and managed by only one operator.

1. Description of the Prior Art

In recent years, the accuracy of measuring distances and angles in surveying for road construction, tunneling, building construction and so on has been significantly improved and the operational efficiency of the survey has been far advanced by use of laser surveying instruments of various types such as a laser range finder for conducting a distance measurement, a laser theodolite for conducting an angle measurement and a laser transit or total station system capable of conducting distance and angle measurements.

However, so far as the survey depends on traditional surveying methods typified by traverse surveying and triangular surveying, it is necessary to dispose at least one surveyor for operating the aforementioned surveying instruments at the survey reference station (base point) and one supplementary operator for carrying a leveling staff for a telescope range finder or a reflecting target used for a laser surveying instrument to plurality of surveying stations (subsidiary survey points). That is, the surveying work has conventionally required at least two surveyors or operators as a matter of course.

To be more specific, it is possible to automatically calculate the desired geodetic results such as an area, relative positions, and gradient of land from the measured survey data (e.g. distance and angle values) obtained by the aforementioned stationary surveying instrument disposed at the base point for surveying by the aid of a data processing system including a computer. However, the data processing system of this type is usually connected to the stationary surveying instrument located at the base point so as to be operated by the one operator. In a word, the operator could not necessarily leave the stationary surveying instrument at the base point during surveying. Accordingly, unless the supplementary operator is not wanted at the subsidiary survey point, the number of operators required for surveying can in no way be reduced under the existing conditions.

OBJECT AND SUMMARY OF THE INVENTION

One object of this invention is to provide an automatic surveying apparatus which can be handled easily and reliably by only one operator for making a survey of construction sites such as land surface and building by use of an automatic processing system including a computer.

Another object of this invention is to provide an automatic surveying apparatus capable of automatically collecting and finding the desired various geodetic data such as an area, relative positions, and gradient of land from subsidiary survey points with a high degree of accuracy at high speed during surveying.

To attain the objects mentioned above according to this invention, there is provided an automatic surveying apparatus comprising a base unit including a laser projector for irradiating a laser beam, a laser range finder, angle measuring means and universal slewing means, which base unit is disposed at a base point, a target unit including a target screen for receiving the laser beam from the laser projector to form a laser spot thereon and an image pickup means for finding the coordinates of the laser spot on the screen, which target unit is disposed at one of a plurality of subsidiary survey points, a data processing unit for finding desired survey results from the measured data of the laser range finder, angle measuring means and image pickup means, and a pair of first and second wireless transmit-receive means.

The first transmit-receive means is connected to the base unit and the second transmit-receive means is connected to the target unit.

Distance data measured by the laser range finder and angle data measured by the angle measuring means are transmitted from the first transmit-receive means to the second transmit-receive means by wireless and are inputted to the data processing unit. On the other hand, command signals for controlling the universal slewing means are manually inputted to the data processing unit and are issued to the universal slewing means through the second and first transmit-receive means by wireless. Upon reception of the distance data from the laser range finder, the angle data from the angle measuring means and the positional data of the laser spot coordinates from the image pickup means, the data processing unit executes arithmetic operations to find the desired survey results. Since the base unit can be operated by wireless from the survey point at which the target unit is disposed, all of the operations for surveying can be carried out at the survey point by one operator. By the aid of a computer system and laser measuring system, an area, relative positions and gradient of land or other measuring subjects can be measured with a high degree of accuracy in real time.

These and other objects and characteristics of the present invention will become apparent from the detailed description given below.

BRIEF DESCRIPTION OF THE DRAWINGS

FIG. 3 is a flowchart for surveying by use of the apparatus of this invention.

DETAILED DESCRIPTION OF THE PREFERRED EMBODIMENT

Figure 1:
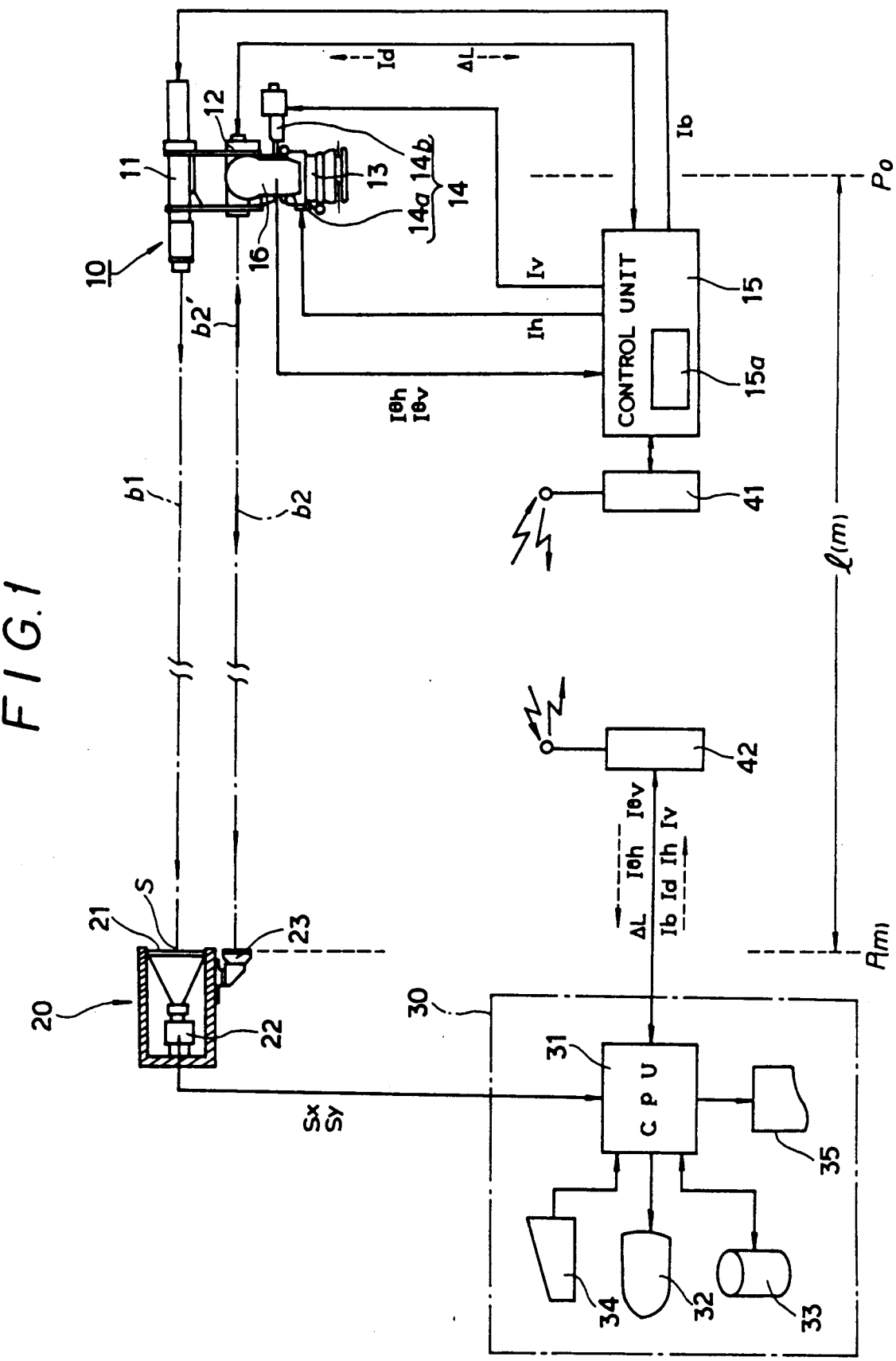
FIG. 1 is a schematic diagram showing one embodiment of an automatic surveying apparatus according to this invention.

As shown in FIG. 1 by way of example, the automatic surveying apparatus according to this invention comprises a stationary base unit 10 which is disposed at a survey reference station (base point) P0 and a target unit 20 which is temporarily disposed at one of subsidiary survey points, P(m) [m=1 ... n], which is usually distant from the base point P0.

The base unit 10 includes a laser projector 11 which irradiates a laser beam b1 toward the target unit 20 and a laser range finder 12 which irradiates a laser beam b2 in a direction parallel to the laser beam b1 radiating from the laser projector 11 so as to measure the distance l(m) to the survey point P(m) on the basis of the time delay (phase difference) between the the laser beam b2 and beam b2' reflected from the target unit 20.

The laser projector 11 and laser range finder 12 are integrally combined and mounted on a mount base 13 supported by, for example, a tripod so as to be rotatable in all directions by a universal slewing means 14 comprising a horizontally rotating motor 14a and a vertically rotating motor 14b. By the compositional operation of the horizontally and vertically rotating motors 14a and 14b, the laser beams b1 and b2 can be selectively directed in the desired direction. The motors 14a, 14b are driven by command signals Ih and Iv from a control unit 15 so as to cause the combined laser projector 11 and range finder 12 to be directed substantially in all directions.

The horizontally and vertically angular movements of the combined laser projector 11 and range finder 12 which are rotated by the compositional operation of the motors 14a, 14b are successively detected by an angle measuring means 16 to output angular data signals I$\theta$h and I$\theta$v to the control unit 15. The angle measuring means 16 is preferably of an incremental type or an absolute type employing a photoelectric rotary encoder.

The laser projector 11 is operated by a command signal Ib fed from the control unit 15 to oscillate the laser beam b1. The laser range finder 12 is operated by a command signal Id to effect the distance measurement, consequently outputting to the control unit 15 a distance signal $\Delta$L representing the measured distance l(m) between the base point P0 and the subsidiary survey point P(m).

The control unit 15 is provided with an operation panel 15a for enabling driven components including the laser projector 11, range finder 12 and motors 14a, 14b to be manually controlled. The control unit 15 is connected to a first wireless transmit-receive means 41 so as to mutually transfer therebetween the command signals to be given to the driven components and various data signals sent from the driven components.

On the other hand, the target unit 20 is temporarily disposed at the survey point P(m) which is as distant as several hundred meters from the base point P0 in some cases. The target unit 20 comprises a target screen 21 on which the laser beam b1 from the laser projector 11 impinges to form a laser spot s, an image pickup means 22 disposed behind the target screen 21 for dissecting the laser spot s on the screen 21 to find the coordinates of the laser spot on the screen, and a reflecting target 23 for reflecting the laser beam b2 from the laser range finder 12.

The image pickup means 22 may of course be of any type of camera capable of outputing positional data signals Sx, Sy representing the coordinates of the laser spot s on the screen 21. As the image pickup means, there may be used a solid image pickup means consisting of a CCD or an electronic image pickup tube such as a flying spot dissector. Though the image pickup means 22 in this embodiment is placed behind the target screen 21, it may be placed in front of the screen 21.

The reflecting target 23 serves to send back the reflected beam b2' in the opposite direction to the laser range finder 12 when the reflecting plane of the target becomes perpendicular to the laser beam b2. The target screen 21 and reflecting target 23 must be arranged substantially in a common plane. The distance between the centers of the target screen 21 and reflecting target 23 should preferably nearly equal that of the laser beams b1 and b2.

The aforenoted target unit 20 may be a target unit used in a conventional laser theodolite capable of taking a measurement of surveying position and yawing. The target unit 20 is preferably easy to transport and is compact so as to be readily mountable on a tripod at the survey point.

At the subsidiary survey point there is disposed a data processing unit 30 for calculating the desired survey results such as an area, relative positions, and gradient of land from the measured data ($\Delta$L, I$\theta$h, I$\theta$v, Sx, Sy) of the aforesaid laser range finder 12, angle measuring means 16 and image pickup means 22. The processing unit 30 also functions to issue control command signals Ib, Id to be input to the laser projector 11 and laser range finder 12.

As illustrated in FIG. 1 as one example, the data processing unit 30 includes a central processing unit (CPU) 31, monitor display 32, auxiliary memory means 33, and input device 34 such as a keyboard. Though this processing unit 30 may be of a general-purpose personal computer, it may otherwise be constructed by subjecting necessary functional circuits to modularization. A portable computer such as the so-called "hand-held or laptop computer" is most suitable.

In the data processing unit 30 (CPU 31), there may be previously programmed an operation expression for arithmetically calculating the desired geodetic results such as an area, volume, relative positions, and gradient of land from the measured traverse data collected from the laser range finder 12, angle measuring means 16 and image pickup means 22. Such an operation expression has been established and well known in various fields including architecture and civil engineering.

The data processing unit 30 may optionally be provided with a printer 35 for outputting the measured data and survey results in hard copy.

On the subsidiary survey point side, the second wireless transmit-receive means 42 is connected to the CPU 31 in the data processing unit 30 and serves to transmit, by wireless, information consisting of the command and data signals between the aforesaid control unit 15 on the base point side and the data processing unit 31 in conjunction with the first wireless transmit-receive means 41. The paired wireless transmit-receive means 41 and 42 fulfil two substantial functions as follows:

The first function of these wireless transmit-receive means 41, 42 is to transmit, from the first wireless means 41 to the second wireless means 42, the distance data signal $\Delta$L representing the distance l(m) from the base point P0 to the survey point P(m) which is outputted by the range finder 12 and the angular signals I$\theta$h, I$\theta$v, representing the horizontal and vertical angular-movements of the laser projector 11 and range finder 12 which are outputted by the angle measuring means 16.

The second function of the wireless means 41, 42 is to transmit, from the second wireless means 42 to the first wireless means 41, various kinds of command or control signals to be given to the driven components in the base unit 10. The command or control signals sent from the second wireless means 42 include the control signals Ih, Iv for driving the horizontally and vertically rotating motors 14a, 14b in the universal slewing means 14, and the command signals Ib, Id for operating the laser projector 11 and the laser range finder 12.

A radio wave is typically used as a transmission medium in the wireless means 41, 42, but light waves such as infrared rays may be used therefor.

The operation of the automatic surveying apparatus above in carring out land surveying will be described with reference to FIG. 2 and the operational flowchart of FIG. 3.

Figure 2:
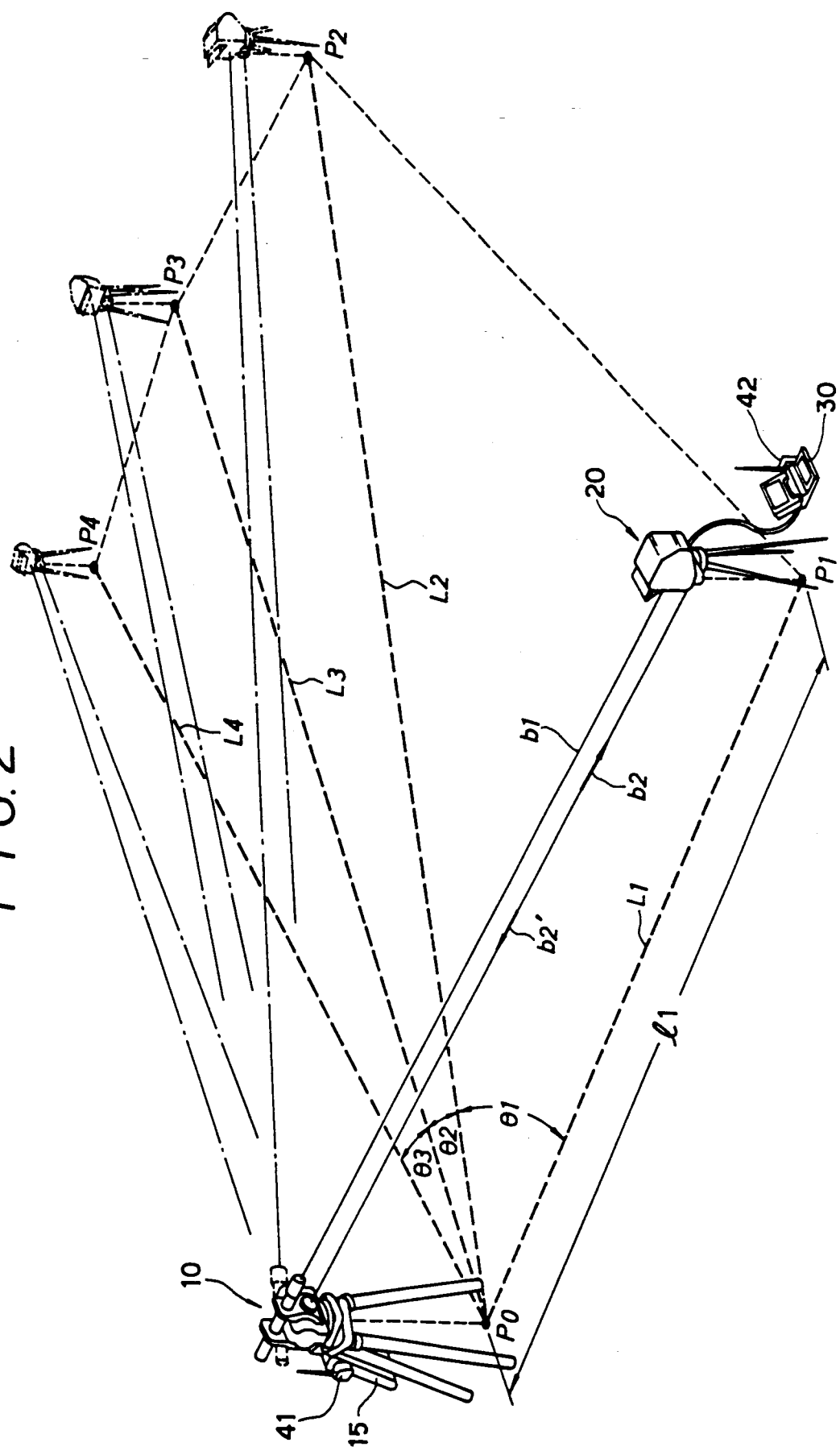
FIG. 2 is an explanatory diagram illustrating the operating principle of the apparatus of this invention.

Here, assuming that a building site having (n+1) reference points as illustrated in FIG. 2 is surveyed for finding the area thereof, there are one base point P0 and four subsidiary survey points P1 to P4 in the site, i.e. n=4 in this illustrated embodiment.

First of all, the aforenoted base unit 10 is located at the base point P0 as a reference station (Process I).

Secondly, the target unit 20 is located at the first survey point P1, and the target screen 21 is roughly directed toward the base unit 10 (Process II).

Then, the laser projector 11 and range finder 12 are driven to radiate the laser beams b1 and b2 by operating the input device 34 in the data processing unit 30. At this time, if the laser beams b1, b2 do not impinge on the screen 21 and reflecting target 23, respectively, the combined laser projector 11 and range finder 12 are adjusted horizontally and vertically by manually inputting the driving command signals Ih, Iv to the input device 34 in the data processing unit 30 until the laser beam b1 impinges on the screen 21 and the laser beam b2 is reflected by the reflecting target 23 and sent back to the range finder 12 (Process III).

When the laser beam b1 radiating from the laser projector 11 impinges on the screen 21 to form a laser spot s, the screen 21 must assume a disposition exactly perpendicular to the laser beam b1. It is possible to confirm whether the screen 21 is perpendicular to the laser beam b1 and the beam b2' reflected by the reflecting target 23 is returned to the range finder 12 by checking the output $\Delta L$ from the range finder 12 which is transmitted to the data processing unit 30 through the control unit 15 and wireless transmit-receive means 41, 42.

At the time of obtaining the measured distance data $\Delta L$, the laser spot s formed on the screen 21 is used by the image pickup means 22 to output the coordinate data Sx, Sy of the laser spot s to the CPU 31 of the data processing unit 30 (Process IV). With this structure, even if the spot s on the screen is off the center of the screen 21 in the horizontal and/or vertical directions, the angle $\theta(k)$ of the survey line L(m) relative to the reference survey line L1 can be accurately obtained from the sum of the measured angle data $I\theta h$, $I\theta v$ and the coordinates (deviation values) Sx(m), Sy(m) of the laser spot s on the target screen 21, where m=1 ... 4, k=1 ... 3, and the relative angles are $\theta 1$ to $\theta 3$.

The measured result data l(1), $I\theta h(1)$, $I\theta v(1)$, Sx(1), Sy(1) as to the survey line L1 between the base point P0 and the first survey point P1 are collected and stored in the memory means 33 (Process V). It is convenient to determine the survey line L1 as a reference line for surveying.

And then, the processes I-V specified above are repeated n-times (Process VI). To sum up, upon completion of the measurement regarding the survey line L(m), the target unit 20 is carried to m+1'th subsidiary survey point P(m+1). At the point P(m+1), a measurement regarding the survey line L(m+1) between the base point P1 and the survey point, P(m+1) is made to obtain the distance data l(m+1) and the spot coordinate data Sx(m+1), Sy(m+1) and the data thus obtained is stored in the memory means 33 along with the outputs $I\theta h(m+1)$, $I\theta v(m+1)$ from the angle measuring means 16, in the same manner of measuring the survey line L1 explained above.

At the time of storing the measured data in the memory means, the desired geodetic results such as the area, volume, relative positions, and gradient of land can be automatically calculated concurrently in accordance with the measured survey data as noted above by means of the data processing unit 30 as occasion demands.

The land area enclosed by the base point P0 and survey points P(m) and P(m+1) can be calculated from the distances l(m) and l(m+1) of two survey lines L(m), L(m+1) between the base point and the respective survey points, and the angle $\theta(k)$ between the survey lines L(m) and L(m+1), where k=1 ... m−1. Since the output data from the angle measuring means 16 include the horizontal angular value $I\theta h$ and vertical angular value $I\theta v$, not only the gradient of land surface but also the land volume can be automatically calculated with a simple arithmetic operation.

As is plain from the foregoing description, according to this invention, once the base unit 10 is disposed at the base point P0, all of the operations for making the desired survey can be conducted at the subsidiary survey point P(m) by only one operator, because the base unit far from the target unit can be controlled by wireless. Also, the automatic surveying apparatus according to this invention can be handled easily and reliably in making a survey of construction sites such as land surface and buildings by use of an automatic processing system including a computer and, further, can be automatically operated to collect and find the desired various geodetic data such as an area, relative positions, and gradient of land at subsidiary survey points with a high degree of accuracy and at high speed during surveying.

As can be readily appreciated, it is possible to deviate from the above embodiments of the present invention and, as will be readily understood by those skilled in this art, the invention is capable of many modifications and improvements within the scope and spirit thereof. Accordingly, it will be understood that the invention is not to be limited by these specific embodiments, but only by the scope and spirit of the appended claims.

What is claimed is:

1. An automatic surveying apparatus comprising:

a base unit including a laser projector for irradiating a first laser beam, a laser range finder for irradiating a second laser beam in a direction parallel to the direction in which said first laser beam is irradiated, for receiving a reflected beam of the second laser beam and for outputting distance data based on the reflected beam, universal slewing means for rotating said laser projector and said laser range finder in horizontal and vertical planes, and angle measuring means for detecting relative angular positions of said laser projector and range finder in the horizontal and vertical planes and for outputting angle data representative of the relative angular positions;

a target unit including a target screen for receiving said first laser beam irradiated by said laser projector such that a laser spot is formed thereon, an image pickup means for determining coordinates of the laser spot on the screen and for outputting positional data representative of the coordinates of the laser spot on said screen, and a reflecting target for reflecting the second laser beam back to said laser range finder;

a data processing unit operatively connected to said target unit and to said base unit for formulating survey results from the data outputted from said laser range finder, said angle measuring means and said image pickup means, and for issuing command signals for controlling said laser projector, said laser range finder and said universal slewing means; and a pair of first and second wireless transmit-receive means operatively connecting said data processing unit between said base unit and said target unit in the apparatus and each for transmitting and receiving signals, said first transmit-receive means being operatively connected to the base unit and said second transmit-receive means being operatively connected to said data processing unit for transmitting by wireless transmission the data outputted from said laser range finder and said angle measuring means from the first transmit-receive means to the second transmit-receive means and the command signals from the second transmit-receive means to the first transmit-receive means and for sending signals received thereby to said base unit and to said data processing unit, respectively.

2. An automatic surveying apparatus according to claim 1, wherein said data processing unit includes means for calculating an area of land from the distance data outputted from said laser range finder representative of lengths of survey lines between a base point and a plurality of survey points and from said angle data outputted from said angle measuring means representative of relative angles defined between said base unit and said survey lines.

3. An automatic surveying apparatus according to claim 1, wherein said universal slewing means comprises a first motor for rotating said laser projector and range finder in the horizontal plane and a second motor for rotating said laser projector and range finder in the vertical plane.

4. An automatic surveying apparatus according to claim 1, wherein said data processing unit includes a central processing unit, a monitor display, auxiliary memory means for storing and a keyboard.

5. A method of surveying comprising:

providing only one base unit including a laser projector for irradiating a first laser beam, a laser range finder for irradiating a second laser beam in a direction parallel to the direction in which said first laser beam is irradiated, for receiving a reflected beam of the second laser beam and for outputting distance data based on the reflected beam, universal slewing means for rotating said laser projector and said laser range detector in horizontal and vertical planes, and angle measuring means for detecting relative angular positions of said laser projector and range finder in the horizontal and vertical planes and for outputting angle data representative of the positions;

disposing said base unit at a base point for surveying;

providing a target unit including a target screen for receiving said first laser beam irradiated by said laser projector so that a laser spot is formed thereon, and image pickup means for determining coordinates of the laser spot on the screen and for outputting positional data representative of the coordinates of the laser spot on said screen, and a reflecting target for reflecting the second laser beam back to said laser range finder;

disposing said target unit at one of a plurality of subsidiary survey points with the target screen directed toward said base unit;

operating the laser projector and the range finder to irradiate the first and second laser beams, and adjusting the directions in which the laser beams are irradiated by any amount necessary to cause the beams to impinge the target screen and the reflecting target, respectively;

providing a data processing unit operatively connected to said target unit and to said base unit for formulating survey results from the data outputted from said laser range finder, said angle measuring means and said image pickup means, and for issuing command signals for controlling said laser projector, said laser range finder and said universal slewing means;

providing a pair of first and second wireless transmit-receive means operatively connecting said data processing unit between said base unit and said target unit in the apparatus and for transmitting and receiving signals, said first transmit-receive means being operatively connected to the base unit and said second transmit-receive means being operatively connected to said data processing unit for transmitting by wireless transmission the data outputted from said laser range finder and said angle measuring means from the first transmit-receive means to the second transmit-receive means and the command signals from the second transmit-receive means to the first transmit-receive means and for sending signals received thereby to said base unit and to said data processing unit, respectively;

moving the target unit to another of said subsidiary survey points while maintaining the base unit at said base point; and subsequently once again operating the laser projector and the range finder with the base unit at said base point, and adjusting the directions in which the laser beams are irradiated by any amount necessary to once again cause the beams to impinge the target screen and the reflecting target.

* * * * *

UNITED STATES PATENT AND TRADEMARK OFFICE
CERTIFICATE OF CORRECTION

PATENT NO.   : 5,055,666

DATED        : October 8, 1991

INVENTOR(S)  : Kenji MIYAHARA

It is certified that error appears in the above-identified patent and that said Letters Patent is hereby corrected as shown below:

In the Foreign Application Priority Data of item [30] on the title page, the date of Japanese Appln. No. 1-134498 has been changed from May 5, 1989 to May 30, 1989.

Signed and Sealed this

Sixteenth Day of March, 1993

Attest:

STEPHEN G. KUNIN

Attesting Officer

Acting Commissioner of Patents and Trademarks